US012671773B2

(12) United States Patent
Haraguchi et al.

(10) Patent No.: US 12,671,773 B2
(45) Date of Patent: Jun. 30, 2026

(54) PAPER SHEET TRANSPORT DEVICE AND PAPER SHEET HANDLING DEVICE

(71) Applicant: JAPAN CASH MACHINE CO., LTD., Osaka (JP)

(72) Inventors: Kohei Haraguchi, Osaka (JP); Naomasa Adachi, Osaka (JP); Hiroyuki Suzuki, Osaka (JP)

(73) Assignee: Japan Cash Machine, Co., Ltd. (JP)

( * ) Notice: Subject to any disclaimer, the term of this patent is extended or adjusted under 35 U.S.C. 154(b) by 0 days.

(21) Appl. No.: 19/211,017

(22) Filed: May 16, 2025

(65) Prior Publication Data

US 2025/0353695 A1 Nov. 20, 2025

(51) Int. Cl.
| | |
|---|---|
| *H04N 1/00* | (2006.01) |
| *B65H 7/02* | (2006.01) |
| *G07D 11/16* | (2019.01) |
| *G07D 11/235* | (2019.01) |

(52) U.S. Cl.
CPC ........... *H04N 1/00814* (2013.01); *B65H 7/02* (2013.01); *G07D 11/16* (2019.01); *G07D 11/235* (2019.01); *H04N 1/00978* (2013.01); *B65H 2220/01* (2013.01); *B65H 2220/02* (2013.01); *B65H 2403/41* (2013.01); *B65H 2403/92* (2013.01); *B65H 2511/212* (2013.01); *B65H 2515/40* (2013.01); *B65H 2701/1912* (2013.01); *G07D 2211/00* (2013.01)

(58) Field of Classification Search
CPC ........... H04N 1/00814; H04N 1/00978; B65H 2515/40; B65H 7/02; B65H 2403/92; B65H 2701/1912; B65H 2513/512; B65H 43/00; G07D 11/16; G07D 11/235; G07D 2211/00; G03G 2215/00772
See application file for complete search history.

(56) References Cited

U.S. PATENT DOCUMENTS

| | | | | |
|---|---|---|---|---|
| 7,809,294 | B2 * | 10/2010 | Hattori | G03G 15/6564 |
| | | | | 399/44 |
| 8,659,805 | B2 * | 2/2014 | Eguchi | H02P 23/14 |
| | | | | 318/434 |
| 11,431,277 | B2 * | 8/2022 | Byun | H02P 29/66 |
| 11,483,445 | B2 * | 10/2022 | Byun | H04N 1/31 |

FOREIGN PATENT DOCUMENTS

| | | |
|---|---|---|
| JP | 2000067302 A | 3/2000 |
| JP | 2015061150 A | 3/2015 |
| JP | 2018042161 A | 3/2018 |

* cited by examiner

*Primary Examiner* — Jeremy R Severson
(74) *Attorney, Agent, or Firm* — FisherBroyles, LLP; Rob L. Phillips

(57) ABSTRACT

The controller causes, when the motor temperature becomes equal to or higher than ta2, the motor to stop for x1 seconds each time one banknote is transported until the motor temperature becomes equal to or lower than ta1, when the motor temperature becomes equal to or higher than ta4, the motor to stop for x2 seconds each time one banknote is transported until the motor temperature becomes equal to or lower than ta3, when the motor temperature becomes equal to or higher than ta6, the motor to stop until the motor temperature becomes equal to or lower than ta4, and when the reading sensor temperature becomes equal to or higher than tb2, the motor to stop until the reading sensor temperature becomes equal to or lower than tb1, where tb1<tb2<ta1<ta2<ta3<ta4<ta6, and x1<x2.

24 Claims, 6 Drawing Sheets

FIG.5

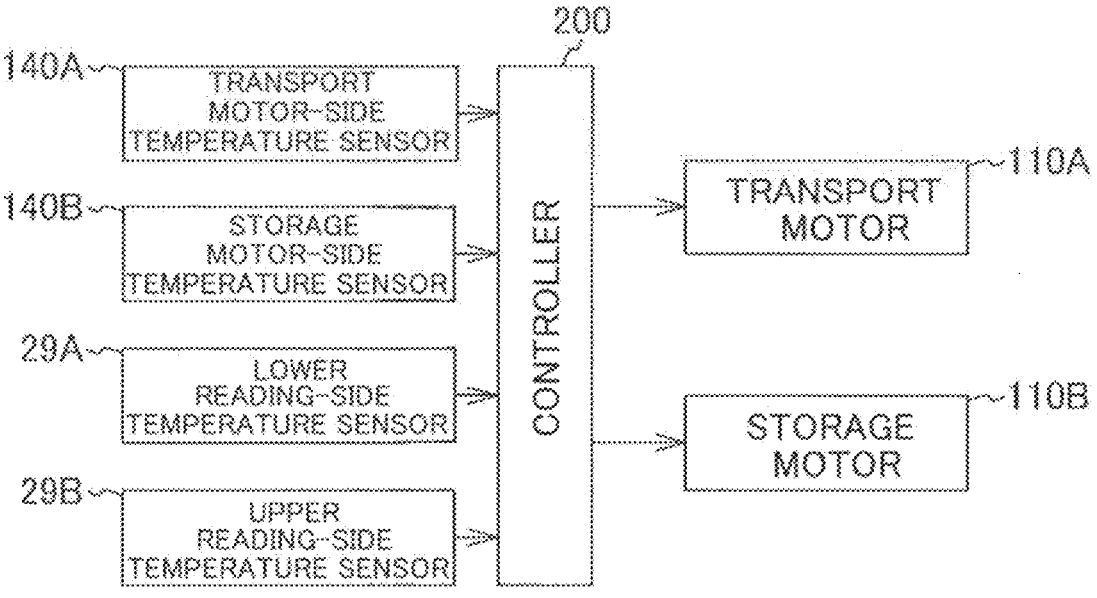

FIG.6

| | | DETECTED TEMPERATURE | CONTROL DETAILS | CONTROL CANCEL TEMPERATURE |
|---|---|---|---|---|
| MOTOR-SIDE TEMPERATURE SENSOR (MOTOR) | CONTROL (1) | TEMPERATURE ta2 | ADD WAITING TIME x1 SECONDS | EQUAL TO OR LOWER THAN TEMPERATURE ta1 |
| | CONTROL (2) | TEMPERATURE ta4 | ADD WAITING TIME x2 SECONDS | EQUAL TO OR LOWER THAN TEMPERATURE ta3 |
| | CONTROL (3) | TEMPERATURE ta6 | STOP MOTOR (STOP BANKNOTE RECEPTION) | EQUAL TO OR LOWER THAN TEMPERATURE ta4 |
| READING-SIDE TEMPERATURE SENSOR (READING UNIT) | CONTROL (4) | TEMPERATURE tb2 | STOP MOTOR (STOP BANKNOTE RECEPTION) | EQUAL TO OR LOWER THAN TEMPERATURE tb1 |

1

PAPER SHEET TRANSPORT DEVICE AND PAPER SHEET HANDLING DEVICE

CROSS-REFERENCES

This application is based upon and claims the benefit of priority to Japanese Patent Application No. 2024-081784, filed on May 20, 2024, with the Japanese Patent Office, the entire contents of which are incorporated herein by reference in its entirety.

FIELD OF THE INVENTION

The embodiments of the present invention relate to a paper sheet transport device that transports paper sheets such as banknotes, and a paper sheet handling device including the paper sheet transport device.

BACKGROUND

A banknote transport device that transports banknotes (an example of paper sheets) in a storing direction or transports banknotes in a dispensing direction is conventionally installed in a banknote handling device such as a banknote deposit machine, various types of automatic vending machines, or a change machine. In recent years, downsizing and increasing the speed associated with a banknote transport device have progressed. With downsizing and speed come increased heat.

Japanese Patent Application Laid-open No. 2000-67302 ("the '302 app") describes a banknote storage device that can accurately process banknotes regardless of the temperature of installation environments.

In the '302 patent, changes in the environmental temperature are addressed by changing the amount of current flowing in a motor or the resistance value thereof at the time the motor is stopped to control the amount of heat generated by the motor. That is, when the environmental temperature is low, the amount of current flowing in the motor or the resistance value thereof is increased to increase the heat generated by the motor, thereby suppressing a delay or the like in the operation caused by a temperature decrease. On the other hand, when the environmental temperature is high, the amount of current flowing in the motor or the resistance value thereof is decreased to decrease the heat generated by the motor, thereby suppressing overheating or the like of the motor.

In the '302 app, a banknote storage device with a high operation reliability with respect to changes in the environmental temperature is realized even in a case where the device is downsized and speed is increased.

SUMMARY

When downsizing a paper sheet transport device, the space for mounting components is limited. As a result, components that are susceptible to heat are sometimes forced to be positioned near a heat-generating component such as a motor. When the speed of processing paper sheets increases, the motor is likely to have a high temperature. Furthermore, when the capacity of a paper sheet storing part arranged downstream of the paper sheet transport device is increased, there is a possibility that the motor is continuously operated for a long period of time and the motor is likely to have a high temperature.

To advance downsizing and increasing the processing speed processing of the paper sheet transport device while also increasing the capacity of the paper sheet storing part, measures preventing excessive heat generation by the motor need to be taken.

The embodiments of the present invention have been made in view of the above circumstances, and has an object to provide a novel paper sheet transport device that prevents problems caused by excessive heat generation by a motor.

To solve the above problems, the embodiments of the present invention comprises a paper sheet transport device including a transport route on which paper sheets are transported, a transport unit that transports the paper sheets along the transport route, a reading unit that has a reading sensor for reading a feature of each paper sheet transported on the transport route, a motor unit that has a motor driving the transport unit, and a controller that executes driving control of the motor, wherein the motor unit includes a motor-side temperature sensor that measures a temperature of the motor, and a thermally-conductive member positioned between the motor-side temperature sensor and the motor, the reading unit includes a reading-side temperature sensor that measures a temperature in the reading unit, and whereby the controller responsive to the motor-side temperature sensor detecting a temperature $ta2$ or a higher temperature alternately repeats control to stop the motor for $x1$ seconds and controls the motor to transport $n1$ paper sheets until the motor-side temperature sensor detects a temperature $ta1$ or a lower temperature, responsive to the motor-side temperature sensor detecting a temperature $ta4$ or a higher temperature, the controller alternately repeats control to stop the motor for $x2$ seconds and controls the motor to transport $n2$ paper sheets until the motor-side temperature sensor detects a temperature $ta3$ or a lower temperature, responsive to the motor-side temperature sensor detecting a temperature $ta6$ or a higher temperature, the controller executes control to stop the motor until the motor-side temperature sensor detects the temperature $ta4$ or a lower temperature, and responsive to the reading-side temperature sensor detecting a temperature $tb2$ or a higher temperature executes control to stop the motor until the reading-side temperature sensor detects a temperature $tb1$ or a lower temperature. Note that the temperatures hold a relation $tb1<tb2<ta1<ta2<ta3<ta4<ta6$, and the times hold a relation $x1<x2$.

According to the embodiments of the present invention, it is possible to prevent problems caused by heat generation of a motor.

BRIEF DESCRIPTION OF DRAWINGS

FIG. 5 is a block diagram of the banknote transport device, illustrating a configuration related to motor control according to the embodiments of the present invention;

FIG. 6 is a diagram illustrating one example of a control method in table form according to the embodiments of the present invention;

DETAILED DESCRIPTION

Figure 1:
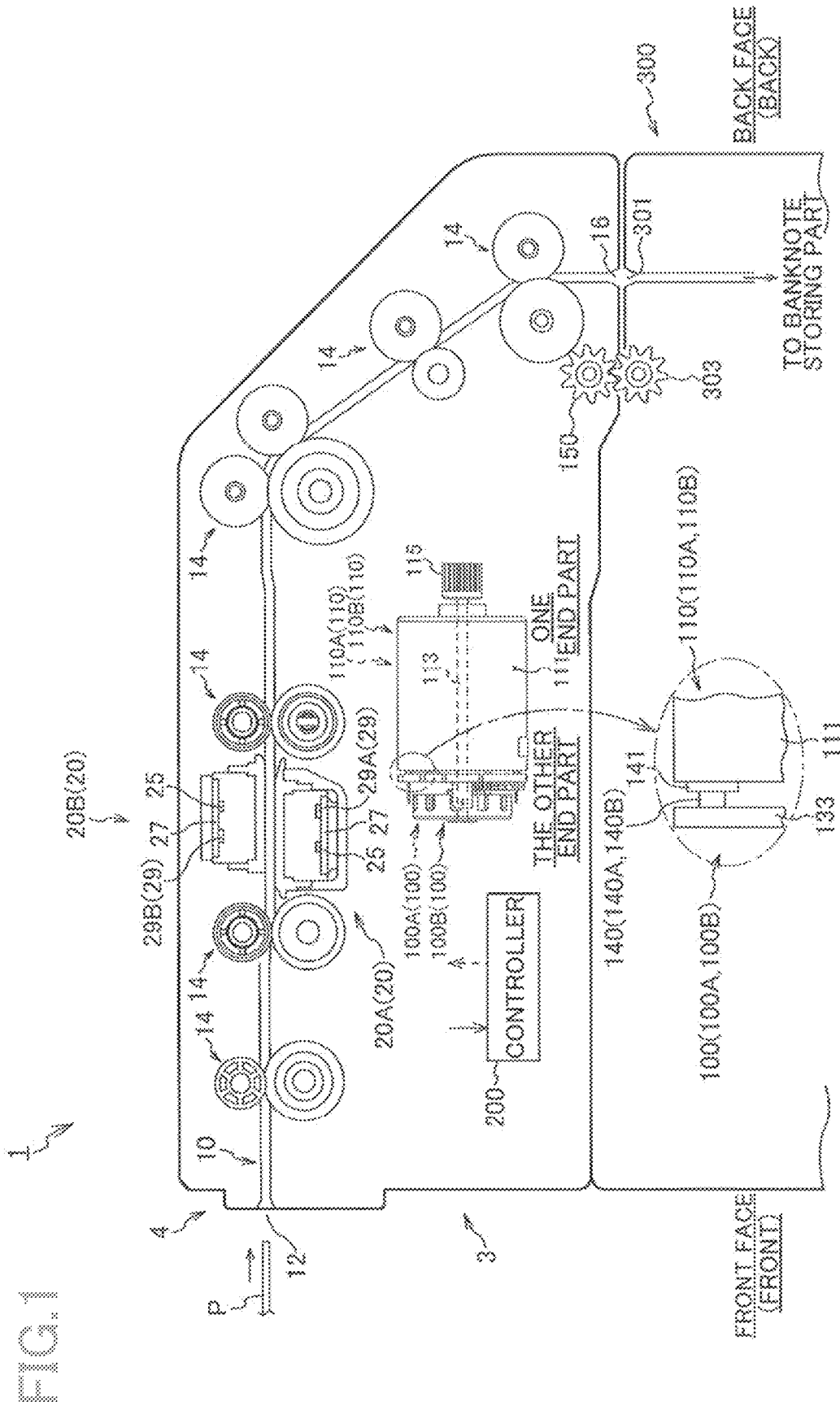
FIG. 1 is a vertical sectional view illustrating an entire internal configuration of a banknote transport device according to the embodiments of the present invention.

The present invention will be described in detail below with embodiments illustrated in the drawings. However, constituent elements, types, combinations, shapes, relative arrangements thereof, and the like described in the embodiments are not intended to limit the scope of the present invention thereto and are merely explanatory examples unless specifically described.

First Embodiment

Figure 2:
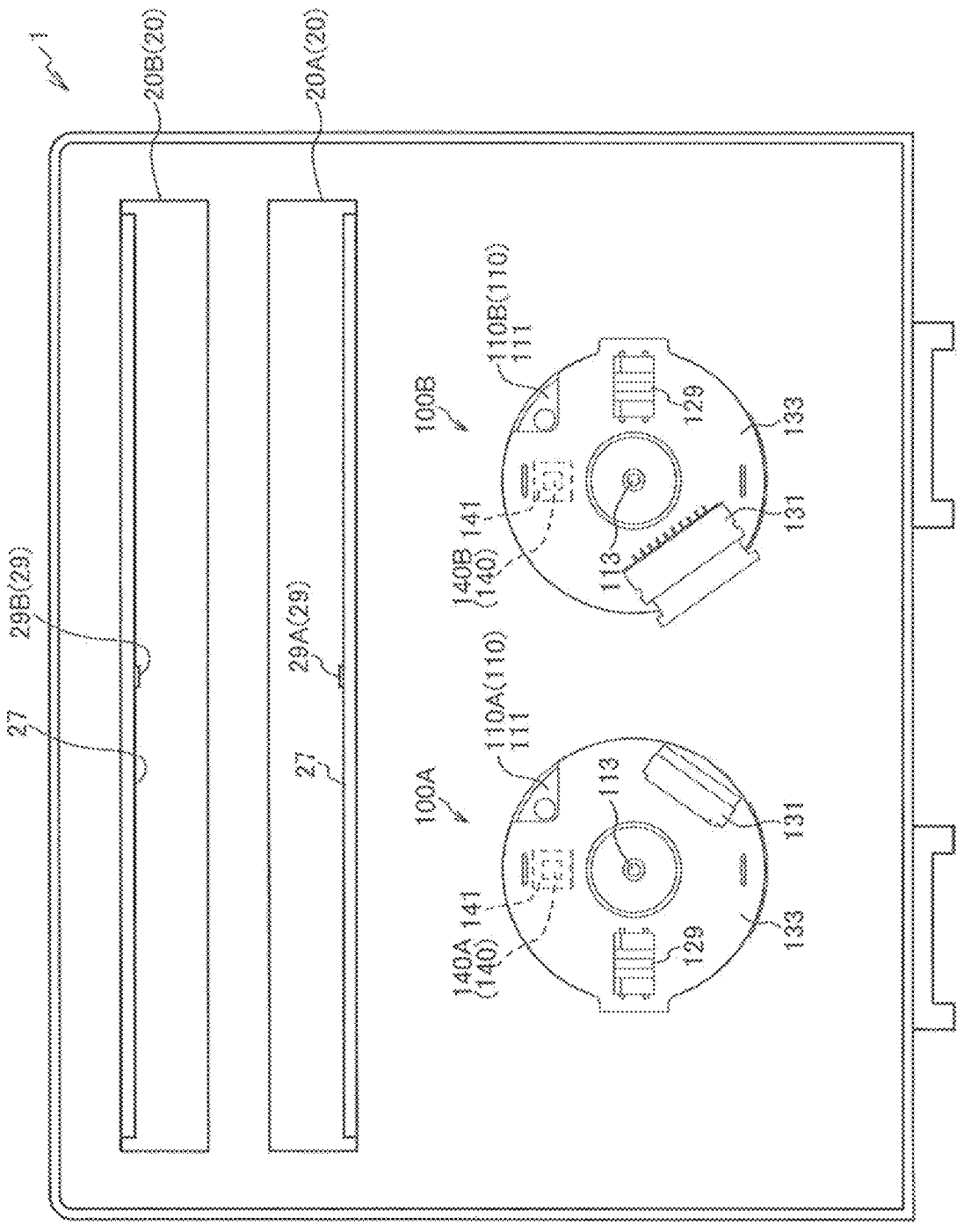
FIG. 2 is a transverse sectional view illustrating a positional relation between a motor and a reading unit according to the embodiments of the present invention.

FIG. 1 is a vertical sectional view illustrating the entire internal configuration of a banknote transport device 1 according to the embodiments of the present invention. FIG. 2 is a transverse sectional view illustrating a positional relation between a motor and a reading unit 20 according to the embodiments of the present invention. The vertical sectional view is a view of the banknote transport device 1 cut in a direction along a transport route, and the transverse sectional view is a view of the banknote transport device 1 cut in a direction orthogonal to the transport route 10. FIG. 2 is a view of an inner part of the banknote transport device 1 observed from the front face (front) side and illustration of a code wheel 121 is omitted.

A banknote transport device (a paper sheet transport device) 1 includes a banknote inlet (a paper sheet inlet) 12 that receives banknotes (paper sheets) P from outside, a transport route 10 on which banknotes P are received and transported, a plurality of transport roller pairs 14 (a transport unit) sequentially arranged at appropriate places along the transport route 10 and that transport the banknotes P along the transport route 10, a reading unit 20 (a lower reading unit 20A and an upper reading unit 20B) arranged at an appropriate place along the transport route 10 and having a reading sensor 25 for reading a feature (e.g., denomination) of each of the banknotes P transported on the transport route 10, a transport motor unit 100A (a motor unit 100) that has a transport motor 110A (a motor 110) that drives the transport roller pairs 14, and a controller 200 that executes driving control of the transport motor 110A that drives the transport roller pairs 14, and a controller 200 that executes driving control of the transport motor 110A.

The transport motor unit 100A includes a transport motor-side temperature sensor 140A, forming part of a motor-side temperature sensor 140, that measures the surface temperature of the transport motor 110A, and a thermally conductive member 141 that is positioned between the motor-side temperature sensor 140 and the motor 110.

The lower reading unit 20A includes a lower reading-side temperature sensor 29A, forming part of a reading-side temperature sensor 29, that detects the temperature in the lower reading unit 20A. The upper reading unit 20B includes an upper reading-side temperature sensor 29B, forming part of the reading-side temperature sensor 29, that detects the temperature in the upper reading unit 20B.

The controller 200 controls the motor 110 to intermittently drive the motor 110 when the motor-side temperature sensor 140 detects a predetermined high temperature (a temperature ta2 or ta4) and stop receiving paper sheets P when the motor-side temperature sensor 140 detects a higher temperature (a temperature ta6).

The controller 200 also controls the motor 110 to stop receiving paper sheets P when the reading-side temperature sensor 29 detects a predetermined high temperature (a temperature tb2).

[Banknote Transport Device]

An internal configuration of the banknote transport device 1 is explained with reference to FIG. 1. While banknotes are described as one example of paper sheets, the present device can transport paper sheets other than banknotes, for example, securities, cash vouchers and tickets.

The banknote transport device 1 is used in a state installed in a banknote handling device body (a paper sheet handling device body) such as a banknote deposit machine, various types of automatic vending machines, or a change machine (not illustrated). Banknotes P received by the banknote transport device 1 are sequentially stored one-by-one in a cashbox (a banknote storing part) in the banknote handling device body after being subjected to recognition of authenticity and denomination of the banknotes P as read by the reading sensor 25. The banknote handling device (the paper sheet handling device) is configured to include the banknote handling device body and the banknote transport device 1.

The banknote transport device 1 includes a lower unit 3, and an upper unit 4 that is supported to be opened and closed relative to the lower unit 3. The banknote transport route (the transport route) 10 is formed between opposed surfaces of the lower unit 3 and the upper unit 4 when the lower unit 3 and upper unit 4 are in a closed state as illustrated in FIG. 1.

The banknote inlet 12 that introduces banknotes P to the inside of the banknote transport device 1 is located at one end of the transport route 10 while the transport roller pairs 14, the reading unit 20 that reads information from each banknote to recognize the denomination and the authenticity thereof, and a banknote outlet (a paper sheet outlet) 16 from which banknotes P are discharged to a banknote storage area (an external paper sheet storage unit) 300 are arranged along the transport route 10 within the banknote transport device 1. The transport motor unit 100A that drives the transport roller pairs 14 for banknote transport, and the controller (a CPU, an MPU, a ROM, and a RAM) 200 that judges the denomination and the authenticity of each banknote P on the basis of recognition information from the reading unit 20 or that controls the transport motor 110A and other control targets on the basis of a banknote detection signal from each of tracking sensors (not illustrated) are arranged at appropriate places within the banknote transport device 1.

The banknote transport device 1 further includes an external output gear 150 that outputs a drive force and a storage motor unit 100B, forming part of the motor unit 100, including a storage motor 110B (a second motor unit 110) that drives the external output gear 150. Driving the storage motor 110B is controlled by the controller 200.

Each of the transport roller pairs 14 comprises a drive roller arranged on the side of the lower unit 3 and a drive roller arranged on the side of the upper unit 4, and includes a configuration to transport a banknote P while nipping both sides of the banknote P.

The banknote transport device 1 further includes the lower reading unit 20A located on the lower side of the transport route 10, and the upper reading unit 20B located on the upper side of the transport route 10. The lower reading unit 20A reads information on the under surface of a banknote P and the upper reading unit 20B reads information on the upper surface of the banknote P.

The reading unit 20 is, for example, a contact image sensor (CIS) that reads an optical pattern of a banknote P. The reading unit 20 includes a sensor control board 27 on which a light-receiving element 25 is mounted. The reading-side temperature sensor 29 that detects the temperature in the reading unit 20 is mounted on the sensor control board 27 of the reading unit 20. The reading unit 20 may be a magnetic sensor that senses a magnetic pattern (magnetic features) of a banknote P as well.

The banknote storage 300 having a banknote storing part (a paper sheet storing part, not illustrated) therein is coupled to the banknote transport device 1. The banknote outlet 16 communicates with a banknote receiving port (a paper sheet receiving port) 301 of the banknote storage 300. The banknote storage 300 stores banknotes P received from the banknote transport device 1 in the banknote storing part through the banknote receiving port 301.

The banknote storage 300 includes a drive gear 303 that meshes with the external output gear 150 to obtain drive force from the storage motor 110B. The banknote storage 300 obtains drive force from outside to move gears and the like included in the banknote storage 300 and stores banknotes P in the banknote storing part.

The controller 200 comprises a unit including a CPU (Central Processing Unit), a ROM (Read Only Memory), and a RAM (Random Access Memory), or comprises an MPU (Micro Processing Unit) or the like that has a necessary module in addition to the elements described above incorporated in one chip. The CPU reads a program from the ROM and loads the program into the RAM to execute the program, so that various functions and means are realized.

The banknote transport device 1 configuration described above is merely an example and various modifications may be incorporated. For example, various alterations or choices of components, such as the number of used motors, arrangement of roller pairs and transport belts, and the types of the reading units are possible.

[Motor Unit]

Figure 3:
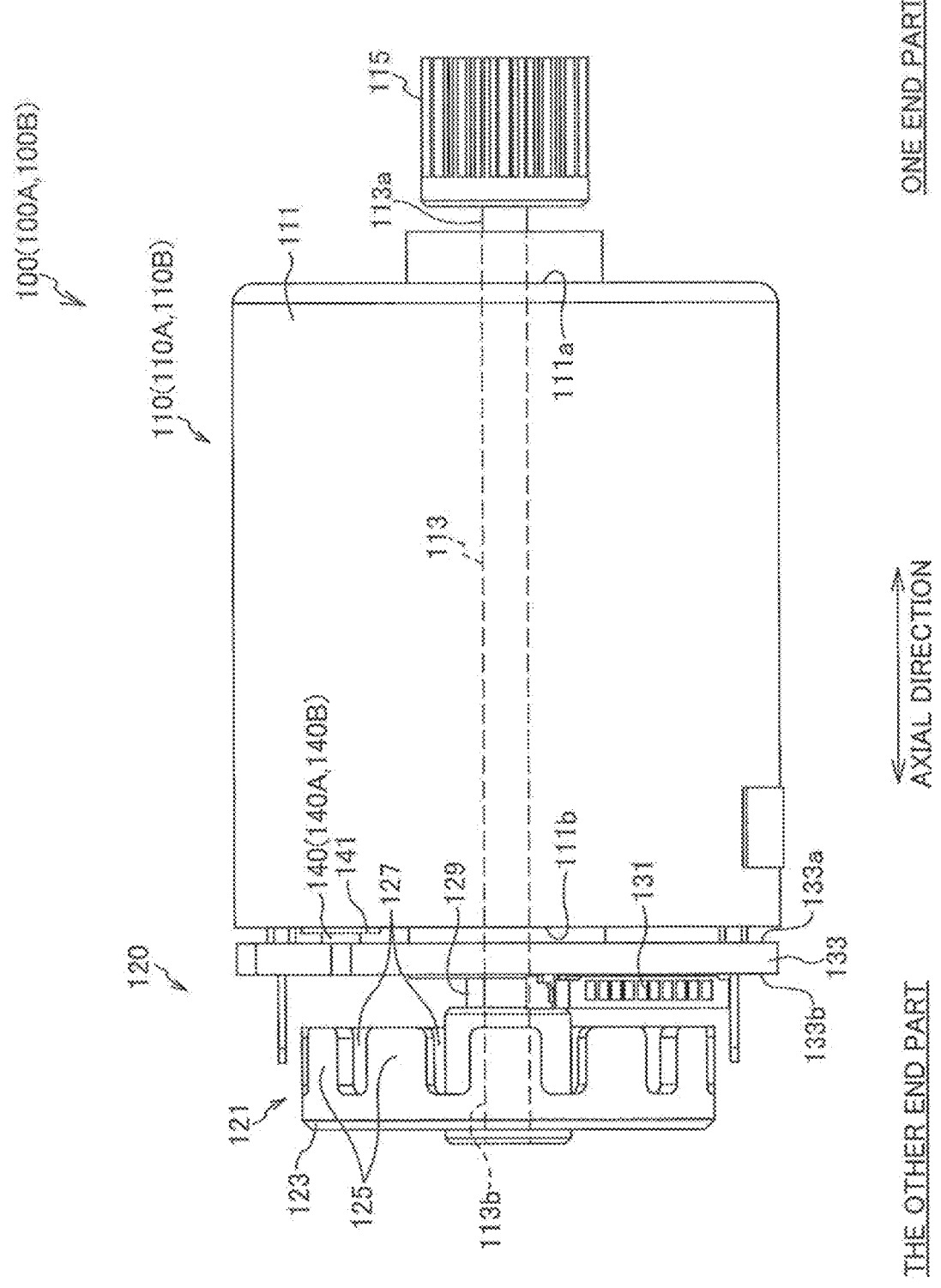
FIG. 3 is a side view of a transport motor unit according to the embodiments of the present invention.
Figure 4:
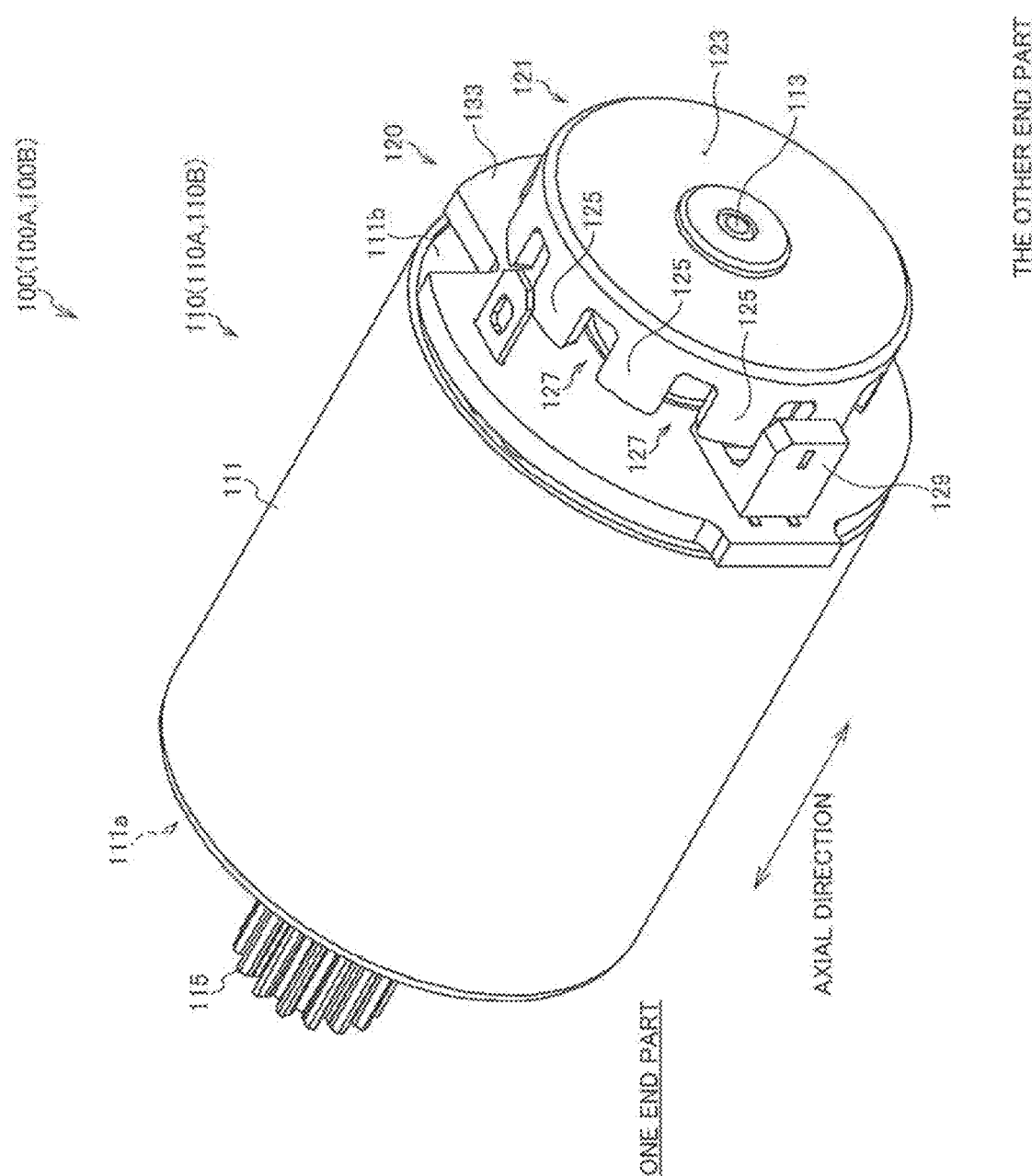
FIG. 4 is a perspective view of the transport motor unit according to the embodiments of the present invention.

FIG. 3 is a side view of the motor unit 100A. FIG. 4 is a perspective view of the motor unit 100A. Basic configurations of the transport motor unit 100A and the storage motor unit 100B are substantially the same. Thus, the transport motor unit 100A and the storage motor unit 100B are described below without specific distinction therebetween.

The motor unit 100 includes the motor 110, a pinion gear 115 that is fixed to one end part 113a of a motor shaft 113 of the motor 110, an encoder unit 120 attached to the other end side of the motor 110 for detecting rotation of the motor shaft 113, and the motor-side temperature sensor 140 (the transport motor-side temperature sensor 140A and the storage motor-side temperature sensor 140B) that measures the temperature of the motor 110.

[Motor and Pinion Gear]

The motor 110 includes a substantially cylindrical housing 111 that houses a rotor and a stator and that has both ends closed, and the motor shaft 113 that rotates integrally with the rotor and has both end parts in the axial direction protruding from end faces 111a and 111b of the housing 111 in the axial direction. As one example, the housing 111 is configured to include a bottomed cylindrical motor case where one end face 111a in the axial direction is closed and the other end face 111b is open, and an end bell that closes the other end face 111b of the motor case. The housing 111 is electrically conductive. The pinion gear 115 is fixed to one end part 113a of the motor shaft 113 in the axial direction to rotate coaxially and integrally with the motor shaft 113. The pinion gear 115 is made of a resin and transmits drive force to gears, rollers, belts, or the like on the downstream side.

[Encoder Unit]

The encoder unit 120 includes the code wheel 121, an optical element (a rotation detector) 129 that detects teeth 125 (slits 127) of the code wheel 121, a processor 131 that processes an electric signal output from the optical element 129, and a motor substrate 133 on which the optical element 129 and the processor 131 are mounted.

The code wheel 121 is fixed to the other end part 113b of the motor shaft 113 in the axial direction and rotates coaxially and integrally with the motor shaft 113. The code wheel 121 includes a disk part 123 fixed to the motor shaft 113. The disk part 123 includes teeth 125 (and slits 127) protruding along the axial direction of the motor shaft 113 from an outer circumferential part of the disk part 123 toward the motor 110 (toward the motor substrate 133) and that are arranged at predetermined intervals along the circumferential direction of the disk part 123. The teeth 125 and the slits 127 function as a scale that is read by the optical element 129 to detect rotation of the motor 110.

The motor substrate 133 is placed between the code wheel 121 and the motor 110. The motor substrate 133 is arranged in such a manner that the other end part 113b of the motor shaft 113 in the axial direction penetrates through the plane of the motor substrate 133 and that one surface 133a faces the other end face 111b of the housing 111 in the axial direction with a predetermined interval therebetween. The code wheel 121 is fixed to the other end part 113b of the motor shaft 113 protruding from the side of the other surface 133b of the motor substrate 133.

The motor substrate 133 is parallel to the code wheel 121. The optical element 129 and the processor 131 are mounted on the other surface 133b of the motor substrate 133. In one embodiment, the optical element 129 is a photointerrupter that includes a light-emitting element, and a light-receiving element 25 arranged to enable each of the teeth 125 (each of the slits 127) of the rotating code wheel 121 to be sequentially sandwiched therebetween. The processor 131 includes at least an output terminal that outputs an electric signal. An A/D converter, signal processing IC, or the like may also be included. A gap between the motor substrate 133 and the housing 111 prevents short circuit of various electric components via the housing 111 and solder or the like exposed on one surface 133a of the motor substrate 133.

By forming the teeth 125 of the code wheel 121 in a shape bent (folded at a right angle) from the disk part 123, the motor unit 100 can be easily assembled. Unitization (assembly) of the motor 110 and the encoder unit 120 enhances the maintenance performance related to components surrounding the motor. Furthermore, the motor unit 100 is configured to be compact.

[Motor-Side Temperature Sensor]

The motor-side temperature sensor 140 is mounted on the one surface 133a of the motor substrate 133. The motor-side temperature sensor 140 is, for example, a packaged temperature sensor IC. Since the motor-side temperature sensor 140 is arranged in the gap between the motor substrate 133 and the housing 111, the motor unit 100 and the banknote transport device 1, including the motor unit 100, are not increased in size.

The thermally conductive member 141 is placed between the motor-side temperature sensor 140 and the other end face 111b of the motor 110 in the axial direction. The thermally conductive member 141 is in close contact with both the motor 110 and the motor-side temperature sensor 140. The thermally conductive member 141 transmits heat of the housing 111 to the motor-side temperature sensor 140. The motor-side temperature sensor 140 measures the temperature of an outer surface of the motor 110 via the thermally conductive member 141.

It is desirable that the thermally conductive member 141 covers the whole of the surface facing the motor 110 among the surfaces of the motor-side temperature sensor 140. The thermally conductive member 141 is set to a size substantially equal to (or larger than) the surface of the motor-side temperature sensor 140. While a thermally conductive sheet having softness or flexibility can be cited as an example of the thermally conductive member 141, the thermally conductive member 141 is not limited thereto.

[Arrangement of Motor Unit 100]

The motor units 100A and 100B are located below the transport route 10. The whole of each of the motor shafts 113 overlaps with the transport route 10 in the upper-lower direction.

The motor units 100A and 100B are arranged below the reading units 20A and 20B. The motor units 100A and 100B are in a positional relationship overlapping with at least a part of the reading units 20A and 20B in the upper-lower direction.

As illustrated in FIG. 1, the motor units 100A and 100B are arranged in such a manner that the motor shafts 113 extend in the longitudinal direction of the transport route 10 (the transport direction of banknotes P). As illustrated in FIG. 2, the motor units 100A and 100B are arranged side-by-side intersecting with (orthogonal to) the longitudinal direction of the transport route 10.

A part of the motor shafts 113 that tend to become the hottest in the motor 110 is in a positional relationship overlapping with the reading units 20A and 20B in the upper-lower direction. Accordingly, the lower reading unit 20A is likely to be heated by being exposed to heat rising from the two motors 110A and 110B.

[Functional Configuration]

FIG. 5 is a block diagram of the banknote transport device 1, illustrating a configuration related to motor control. The motor-side temperature sensors 140A and 140B and the upper and lower reading-side temperature sensors 29A and 29B are connected to input terminals of the controller 200. The transport motor 110A and the storage motor 110B are connected to output terminals of the controller 200.

The controller 200 restricts the drive time of each of the transport motor 110A and the storage motor 110B according to temperatures of the parts detected by the temperature sensors 140 and 29.

[Control Example]

FIG. 6 is a diagram illustrating one example of a control method in table form. As indicated by control (1) in the table, when the motor-side temperature sensor 140 detects a temperature ta2 or a higher temperature, the controller 200 alternately repeats control to stop the motor 110 for x1 seconds and control to drive the motor 110 to transport one (n1) banknote until the motor-side temperature sensor 140 detects a temperature ta1 or a lower temperature.

As indicated by control (2) in the table, when the motor-side temperature sensor 140 detects a temperature ta4 or a higher temperature, the controller 200 alternately repeats control to stop the motor 110 for x2 seconds and control to drive the motor 110 to transport one (n2) banknote until the motor-side temperature sensor 140 detects a temperature ta3 or a lower temperature.

As indicated by control (3) in the table, when the motor-side temperature sensor 140 detects a temperature ta6 or a higher temperature, the controller 200 executes control to stop the motor 110 until the motor-side temperature sensor 140 detects a temperature ta4 or a lower temperature.

As indicated by control (4) in the table, when the reading-side temperature sensor 29 detects a temperature tb2 or a higher temperature, the controller 200 executes control to stop the motor 110 until the reading-side temperature sensor 29 detects a temperature tb1 or a lower temperature.

The above temperatures hold a relation tb1<tb2<ta1<ta2<ta3<ta4<ta6, the times hold a relation x1<x2, and the numbers of banknotes hold a relation n1≥n2.

The setting temperatures ta1 to ta6 are set to enable the pinion gear 115 to be protected. For example, the temperature ta2 is set to prevent the pinion gear 115 from having a temperature above the normal heatproof temperature. The temperature ta4 is set to prevent the pinion gear 115 from having a temperature above the maximum operating temperature. The temperature ta6 is set to prevent the pinion gear 115 from having a temperature above a softening temperature.

It can be difficult to directly detect the temperature of the pinion gear 115 or the motor shaft 113. Therefore, setting temperatures ta1 to ta6 are set based on a correlation between the surface temperature of the motor 110 and the temperature of the pinion gear 115.

The setting temperature tb2 is set to enable the reading unit 20 to be protected. The temperature tb2 is set to prevent the reading unit 20 from having a temperature above the upper limit of the allowable operating temperature.

Figure 7A:
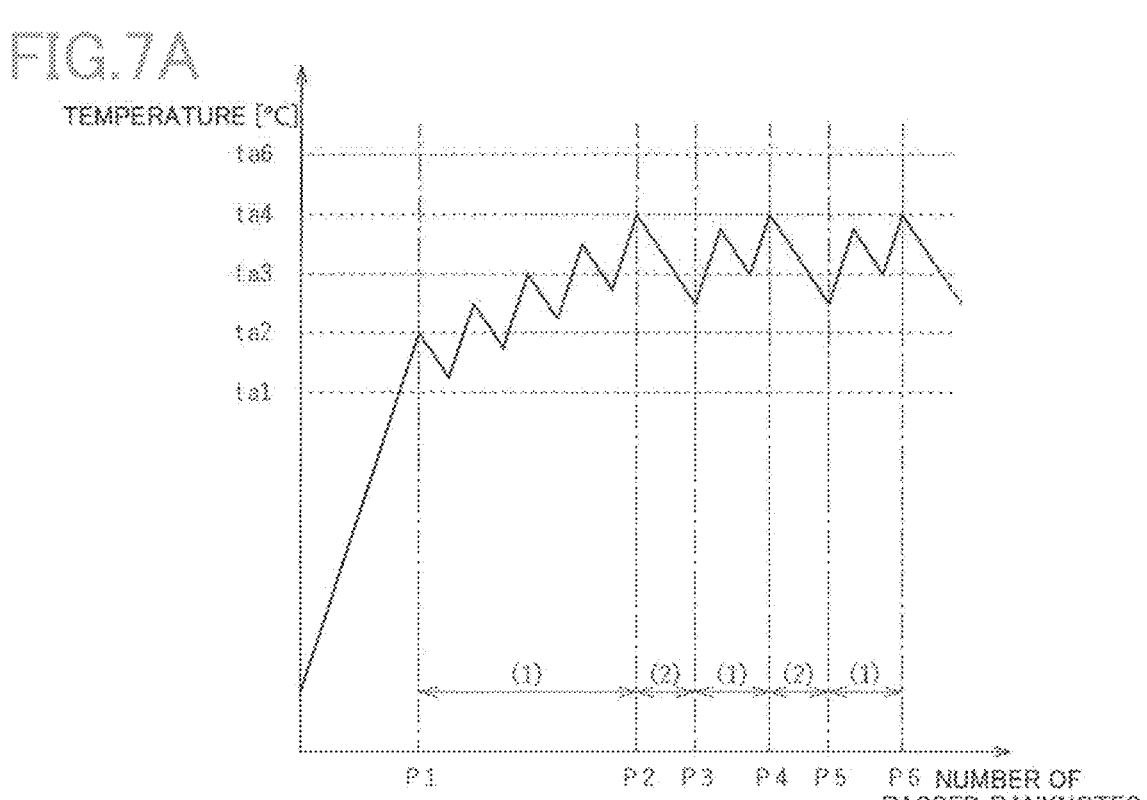
FIG. 7A is a graph illustrating examples of temperature changes of the motor in a case where the control illustrated in FIG. 6 is executed according to the embodiments of the present invention.
Figure 7B:
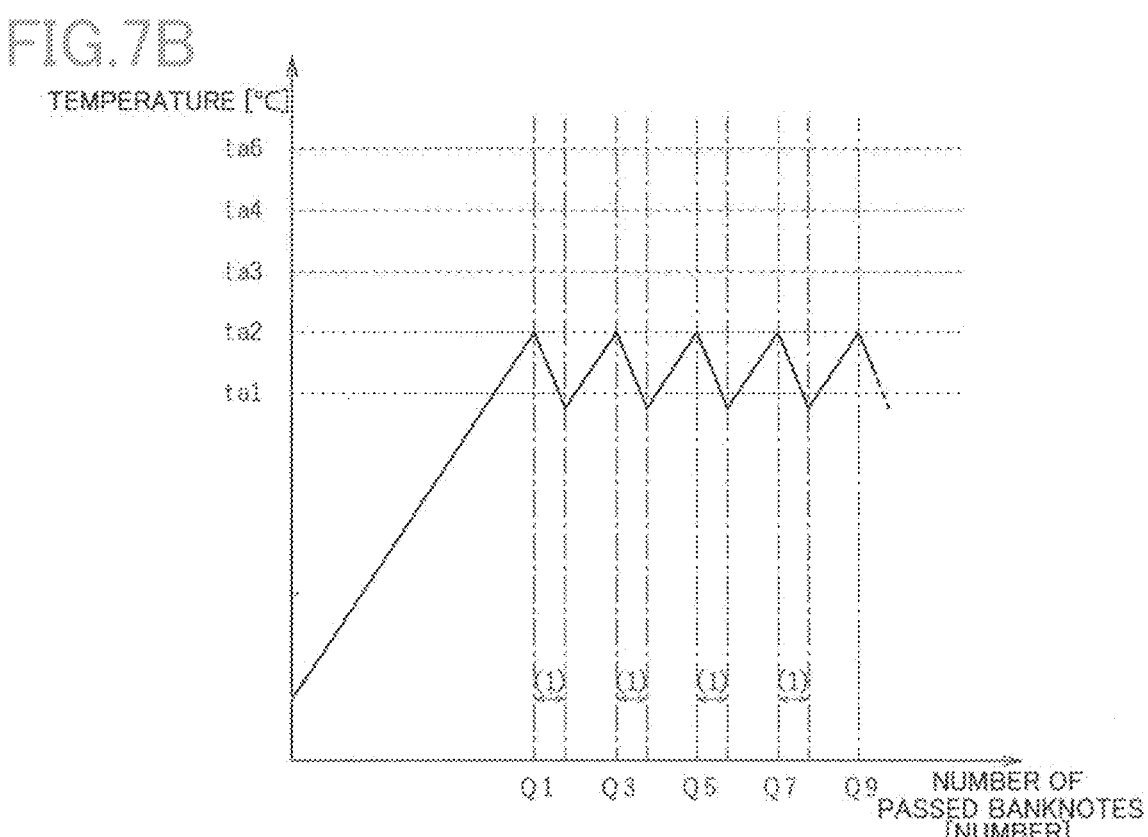
FIG. 7B is a graph illustrating examples of temperature changes of the motor in a case where the control illustrated in FIG. 6 is executed according to the embodiments of the present invention.

FIGS. 7A and 7B are graphs illustrating examples of temperature changes of the motor in a case where the control illustrated in FIG. 6 is executed. FIG. 7A illustrates an exemplary case where the control (1) and the control (2) are executed, and FIG. 7B illustrates an exemplary case where only the control (1) is executed. P1 to P6 in FIG. 7A and Q1 to Q9 in FIG. 7B represent the numbers of passed banknotes P.

In FIG. 7A, the temperature of the motor rapidly increases until P1 banknotes have passed. When the motor-side temperature sensor 140 detects the temperature ta2, the control (1) is executed. Since the temperature of the motor does not become equal to or lower than the temperature ta1 after the control (1) is executed, the control (1) is repeatedly executed. The temperature of the motor 100 continues to gradually increase while finely increasing and decreasing in association with the execution of the control (1). When the motor-side temperature sensor 140 detects the temperature ta4, the control (2) is executed. Since the temperature of the motor becomes equal to or lower than the temperature ta3 by the execution of the control (2), the control (1) is executed. With the control (1) and the control (2) repeatedly executed in this way, the temperature of the motor 100 fluctuates between the temperature ta2 and the temperature ta4 and is kept below the threshold temperature ta6.

In FIG. 7B, the temperature of the motor rapidly increases until Q1 banknotes have passed. When the motor-side temperature sensor 140 detects the temperature ta2, the control (1) is executed. Since the temperature of the motor 100 becomes equal to or lower than the temperature ta1 by the execution of the control (1), the control (1) is canceled. When the motor-side temperature sensor 140 detects again the temperature ta2 after the control (1) is canceled, the control (1) is once again executed. By this repetition of the executed state and the non-executed state of the control (1), the temperature of the motor 100 increases and decreases. In this example, the motor 100 keeps a temperature below the temperature ta6 without execution of the control (2).

Summary of Embodiments, Actions and Effects of
the Present Invention

First Embodiment

A paper sheet transport device (a banknote transport device 1) according to the present embodiment includes a transport route 10 on which paper sheets (banknotes P) are transported, a transport unit (transport roller pairs 14) that transports the paper sheets along the transport route 10, a reading unit 20 that has a reading sensor (a light-receiving element 25) for reading a denomination of each of the paper sheets transported on the transport route 10, a motor unit (a transport motor unit 100A) that has a motor (a transport motor 110A) driving the transport unit, and a controller 200 that executes driving control of the motor 100.

The motor unit 100A includes a motor-side temperature sensor 140 that measures a temperature of the motor 100, and a thermally conductive member 141 positioned between the motor-side temperature sensor 140 and the motor 100.

The reading unit 20 includes a reading-side temperature sensor 29 that measures a temperature in the reading unit 20.

The controller 200 alternately repeats control to stop the motor 100 for x1 seconds and control to drive the motor 100 to transport n1 (one) of the paper sheets until the motor-side temperature sensor 140 detects a temperature ta1 or a lower temperature, when the motor-side temperature sensor 140 detects a temperature ta2 or a higher temperature.

The controller 200 alternately repeats control to stop the motor 100 for x2 seconds and control to drive the motor to transport n2 of the paper sheets until the motor-side temperature sensor 140 detects a temperature ta3 or a lower temperature, when the motor-side temperature sensor 140 detects a temperature ta4 or a higher temperature.

The controller 200 executes control to stop the motor 100 until the motor-side temperature sensor 140 detects the temperature ta4 or a lower temperature, when the motor-side temperature sensor 140 detects a temperature ta6 or a higher temperature.

The controller 200 executes control to stop the motor 100 until the reading-side temperature sensor 140 detects a temperature tb1 or a lower temperature, when the reading-side temperature sensor 140 detects a temperature tb2 or a higher temperature.

Note that the temperatures hold a relation tb1<tb2<ta1<ta2<ta3<ta4<ta6, and the times hold a relation x1<x2.

According to the present embodiment, when the motor 100 reaches a predetermined high temperature, the operation time of the motor 100 is restricted to reduce heat generation of the motor 100. Therefore, occurrence of problems due to heat generation of the motor 100 can be prevented.

Second Embodiment

In the paper sheet transport device (the banknote transport device 1) according to the present embodiment, the motor (the transport motor 110A) includes a housing 111 that houses a rotor, and a motor shaft 113 that rotates integrally with the rotor and that has both end parts 113a and 113b in an axial direction protruding from end faces 111a and 111b of the housing 111 in an axial direction.

The motor unit (the transport motor unit 100A) includes a motor substrate 133 through which another end part 113b of the motor shaft 113 in the axial direction penetrates within a plane thereof and that has one surface 133a arranged to face another end face 111b of the housing 111 in an axial direction with a predetermined interval away therefrom, a code wheel 121 that is fixed to another end part 113b of the motor shaft 113 protrudes toward a side of another surface 133b of the motor substrate 133 and that has a scale (teeth 125, slits 127) formed along a circumferential direction, and a rotation detector (an optical element 129) that is mounted on a side of the motor substrate 133 to detect the scale of the code wheel 121.

The motor-side temperature sensor 140 is mounted on a side of one surface of the motor substrate 133.

The code wheel 121, the rotation detector 129, and the motor substrate 133 constitute an encoder unit 120. The motor substrate 133 is used as a support on which the motor-side temperature sensor 140 is mounted.

A gap between the motor substrate 133 and the housing 111 prevents electric components from short circuiting. The motor-side temperature sensor 140 is, for example, a temperature sensor IC and is placed in the gap between the motor substrate 133 and the housing 111. The thermally conductive member 141 is positioned within the gap between the motor-side temperature sensor 140 and the housing 111, and the motor-side temperature sensor 140 detects the temperature of the motor 100 via the thermally conductive member 141.

According to this embodiment, since the motor 100, the encoder unit 120, and the temperature sensor 140 are assembled as a unit, the maintenance performance is high, and the motor unit 100 is configured to be compact. Since the motor substrate 133 is used to place the motor-side temperature sensor 140 in the gap between the motor substrate 133 and the housing 111, the device is not increased in the size.

Third Embodiment

In the paper sheet transport device (the banknote transport device 1) according to the present embodiment, the motor (the transport motor 110A) is arranged below the reading unit 20 in a positional relationship overlapping with at least a part of the reading unit 20 in an upper-lower direction.

The reading unit 20 has a risk of causing problems when subjected to high temperatures. For example, images can be distorted when the reading unit 20 is subjected to high temperatures. In the present embodiment, since the reading unit 20 is arranged above the motor 100 the reading unit 20 may be subjected to the temperature of the motor 100.

According to this embodiment, when the motor 100 reaches a predetermined high temperature, the operation time of the motor 100 is restricted to reduce heat generation of the motor 100, or the motor 100 is stopped to prevent heat from being generated. Therefore, occurrence of problems due to overheating of the reading unit 20 can be prevented.

Fourth Embodiment

The paper sheet transport device (the banknote transport device 1) according to the present embodiment includes a second motor (a storage motor 110B) that is placed adjacent to the motor (the transport motor 110A) below the reading unit 20 and that outputs drive force to an external device (a banknote storage 300), and the second motor 110B is in a positional relationship overlapping with at least a part of the reading unit 20 in an upper-lower direction.

The second motor 110B functions as a drive source, for example, at a time when a banknote storage 300 having no power performs a banknote storing operation. The reading unit 20 is placed above two motors and is in a positional relationship likely to be affected by an increase in the temperatures of these motors.

According to this embodiment, when the motor has a predetermined high temperature, the operation time of the motor is restricted to reduce heat generation of the motor, or the motor is stopped to prevent heat from being generated. Therefore, occurrence of problems due to overheating of the reading unit 20 can be prevented.

Fifth Embodiment

In the paper sheet transport device (the banknote transport device 1) according to the present embodiment, the code wheel 121 includes a disk part 123 arranged in parallel to the motor substrate 133. A plurality of teeth 125 protrude in an axial direction of the motor shaft 113 from an outer circumferential part of the disk part 123 toward the motor substrate 133 and are arranged at predetermined intervals along a circumferential direction of the disk part 123.

The rotation detector (the optical element 129) is a photointerrupter that includes a light-emitting element and a light-receiving element 25 arranged to sequentially sandwich each of the teeth 125 of the code wheel 121 that is rotating therebetween.

Due to the teeth 125 of the code wheel 121 being folded at a right angle with respect to the disk part 123, the motor unit 100 can be easily assembled. Unitization (assembly) of the motor 100 and the encoder unit 120 enhances the maintenance performance related to components surrounding the motor 100. Furthermore, the motor unit 100 is configured to be compact.

Sixth Embodiment

In the paper sheet transport device (the banknote transport device 1) according to the present embodiment, the motor (the transport motor 110A) includes a housing 111 that houses a rotor, and a motor shaft 113 that rotates integrally with the rotor and has both end parts 113*a* and 113*b* in an axial direction protruding from end faces 111*a* and 111*b* of the housing 111 in an axial direction.

A resin pinion gear 115 that transmits drive force to the transport unit (the transport roller pairs 14) is fixed to one end part 113*a* of the motor shaft 113 in an axial direction.

The temperature ta2 is set to prevent the pinion gear 115 from having a temperature above a normal heatproof temperature. The temperature ta4 is set to prevent the pinion gear 115 from having a temperature above a maximum operating temperature. The temperature ta6 is set to prevent the pinion gear 115 from having a temperature above a softening temperature.

The temperature tb2 is set to prevent the reading unit 20 from having a temperature above an upper limit of an allowable operating temperature.

The resin pinion gear 115 has a risk of softening and becoming incapable of transmitting drive force when subjected to a high temperature. The temperatures ta2, ta4, and ta6 are set to enable protection of the pinion gear 115. According to the present embodiment, occurrence of problems such as softening of the pinion gear 115 can be prevented.

When subjected to high temperatures, the reading unit 20 has a risk of causing problems, such as the distortion of images. The temperature tb2 is set to enable protection of the reading unit 20. According to the present embodiment, it is possible to prevent occurrence of problems such as distortion of an image.

Seventh Embodiment

The present embodiment is a paper sheet handling device including the paper sheet transport device. The paper sheet handling device according to the present embodiment incorporates the benefits provided by the paper sheet transport device (the banknote transport device 1).

Although the invention has been described in detail with reference to several embodiments, additional variations and modifications exist within the scope and spirit of the invention as described and defined in the following claims.

What is claimed is:

1. A paper sheet transport device comprising a transport route on which paper sheets are transported, a transport unit that transports the paper sheets along the transport route, a reading unit that has a reading sensor, a motor unit that has a motor driving the transport unit, and a controller that executes driving control of the motor, wherein:

the motor unit includes a motor-side temperature sensor that measures a temperature of the motor, and a thermally conductive member positioned between the motor-side temperature sensor and the motor;

the reading unit includes a reading-side temperature sensor that measures a temperature at the reading unit; and a controller configured to:

responsive to the motor-side temperature sensor detecting a threshold temperature, alternatively repeat control to stop the motor for a pre-established number of seconds and drive the motor to transport a pre-established number of the paper sheets until the motor-side temperature sensor detects a temperature below the threshold temperature by a pre-established amount; and responsive to a reading-side temperature sensor detecting a reading-side threshold temperature, execute control to stop the motor until the reading-side temperature sensor detects a reading-side temperature below the reading-side threshold temperature by a pre-established amount.

2. The paper sheet transport device according to claim 1 wherein said controller is further configured to:

responsive to the motor-side temperature sensor detecting a second threshold temperature or a higher temperature, alternatively repeat control to stop the motor for a first pre-established number of seconds and drive the motor to transport a first pre-established number of the paper sheets until the motor-side temperature sensor detects a first threshold temperature or a lower temperature, responsive to the motor-side temperature sensor detecting a fourth threshold or a higher temperature, alternatively repeat control to stop the motor for a second pre-established number of seconds and drive the motor to transport a second pre-established number of the paper sheets until the motor-side temperature sensor detects a third threshold temperature or a lower temperature, responsive to the motor-side temperature sensor detecting a sixth threshold temperature or a higher temperature, executes control to stop the motor until the motor-side temperature sensor detects the fourth threshold temperature or a lower temperature, and responsive to a reading-side temperature sensor detecting a second reading-side threshold temperature or higher temperature, executes control to stop the motor until the reading-side temperature sensor detects a first reading-side threshold temperature or a lower temperature; and wherein the temperatures hold a relationship whereby the first reading-side threshold temperature is less than the second reading-side threshold temperature is less than the first threshold temperature is less than the second threshold temperature is less than the third threshold temperature is less than the fourth threshold temperature is less than the sixth threshold temperature and the times hold a relationship whereby the first pre-established number of seconds is less than the second pre-established number of seconds.

3. A paper sheet handling device comprising the paper sheet transport device according to claim 2.

4. The paper sheet transport device according to claim 1, wherein the motor includes a housing that houses a rotor, and a motor shaft that rotates integrally with the rotor and wherein both ends of the motor shaft protrude from end faces of the housing in an axial direction;

the motor unit includes a motor substrate through which one end of the motor shaft in the axial direction penetrates within a plane thereof and has a first surface arranged to face one end face of the housing in an axial direction with a space therebetween, a code wheel fixed to one end of the motor shaft protruding toward a side of a second surface of the motor substrate and that has a scale formed along a circumferential direction, and a rotation detector mounted on a side of a third surface of the motor substrate to detect the scale of the code wheel; and the motor-side temperature sensor is mounted on a side of one surface of the motor substrate.

5. The paper sheet transport device according to claim 4, wherein the motor is arranged below the reading unit in a positional relationship overlapping with at least a part of the reading unit in an upper-lower direction.

6. The paper sheet transport device according to claim 5, including a second motor that is placed adjacent to the motor below the reading unit and that outputs drive force to an external device, wherein the second motor is in a positional relationship overlapping with at least a part of the reading unit in an upper-lower direction.

7. A paper sheet handling device comprising the paper sheet transport device according to claim 6.

8. A paper sheet handling device comprising the paper sheet transport device according to claim 5.

9. The paper sheet transport device according to claim 4, wherein the code wheel includes a disk part that is arranged in parallel to the motor substrate, and a plurality of teeth that protrude along an axial direction of the motor shaft from an outer circumferential part of the disk part toward the motor substrate and that are arranged at predetermined intervals along a circumferential direction of the disk part; and the rotation detector is a photointerrupter that includes a light-emitting element and a light-receiving element arranged to sequentially sandwich each of the teeth of the code wheel rotating therebetween.

10. A paper sheet handling device comprising the paper sheet transport device according to claim 4.

11. The paper sheet transport device according to claim 1, wherein the motor includes a housing that houses a rotor, and a motor shaft that rotates integrally with the rotor and that has both end parts in an axial direction protruding from end faces of the housing in an axial direction;

a resin pinion gear that transmits drive force to the transport unit is fixed to one end part of the motor shaft in an axial direction;

the second threshold temperature is set to prevent the pinion gear from having a temperature above a normal heatproof temperature;

the fourth threshold temperature is set to prevent the pinion gear from having a temperature above a maximum operating temperature;

the sixth threshold temperature is set to prevent the pinion gear from having a temperature above a softening temperature; and the second reading-side threshold temperature is set to prevent the reading unit from having a temperature above an upper limit of an allowable operating temperature.

12. A paper sheet handling device comprising the paper sheet transport device according to claim 1.

13. A paper sheet transport device comprising a transport route on which paper sheets are transported, a transport unit that transports the paper sheets along the transport route, a reading unit that has a reading sensor, a motor unit that has a motor driving the transport unit, and a controller that executes driving control of the motor, wherein the motor unit includes a motor-side temperature sensor that measures a temperature of the motor, and a thermally conductive member positioned between the motor-side temperature sensor and the motor;

the reading unit includes a reading-side temperature sensor that measures a temperature at the reading unit; and a controller configured to:

responsive to the motor-side temperature sensor detecting a second threshold temperature or a higher temperature, alternatively repeat control to stop the motor for a first pre-established number of seconds and drive the motor to transport a first pre-established number of the paper sheets until the motor-side temperature sensor detects a first threshold temperature or a lower temperature, responsive to the motor-side temperature sensor detecting a fourth threshold or a higher temperature, alternatively repeat control to stop the motor for a second pre-established number of seconds and drive the motor to transport a second pre-established number of the paper sheets until the motor-side temperature sensor detects a third threshold temperature or a lower temperature, responsive to the motor-side temperature sensor detecting a sixth threshold temperature or a higher temperature, executes control to stop the motor until the motor-side temperature sensor detects the fourth threshold temperature or a lower temperature, and responsive to a reading-side temperature sensor detecting a second reading-side threshold temperature or higher temperature, executes control to stop the motor until the reading-side temperature sensor detects a first reading-side threshold temperature or a lower temperature; and wherein the temperatures hold a relationship whereby the first reading-side threshold temperature is less than the second reading-side threshold temperature is less than the first threshold temperature is less than the second threshold temperature is less than the third threshold temperature is less than the fourth threshold temperature is less than the sixth threshold temperature and the times hold a relationship whereby the first pre-established number of seconds is less than the second pre-established number of seconds.

14. The paper sheet transport device according to claim 13, wherein the motor includes a housing that houses a rotor, and a motor shaft that rotates integrally with the rotor and wherein both ends of the motor shaft protrude from end faces of the housing in an axial direction;

the motor unit includes a motor substrate through which one end of the motor shaft in the axial direction penetrates within a plane thereof and has a first surface arranged to face one end face of the housing in an axial direction with a space therebetween, a code wheel fixed to one end of the motor shaft protruding toward a side of a second surface of the motor substrate and that has a scale formed along a circumferential direction, and a rotation detector mounted on a side of a third surface of the motor substrate to detect the scale of the code wheel; and the motor-side temperature sensor is mounted on a side of one surface of the motor substrate.

15. The paper sheet transport device according to claim 14, wherein the motor is arranged below the reading unit in a positional relationship overlapping with at least a part of the reading unit in an upper-lower direction.

16. The paper sheet transport device according to claim 15, including a second motor that is placed adjacent to the motor below the reading unit and that outputs drive force to an external device, wherein the second motor is in a positional relationship overlapping with at least a part of the reading unit in an upper-lower direction.

17. A paper sheet handling device comprising the paper sheet transport device according to claim 16.

18. A paper sheet handling device comprising the paper sheet transport device according to claim 15.

19. The paper sheet transport device according to claim 14, wherein the code wheel includes a disk part that is arranged in parallel to the motor substrate, and a plurality of teeth that protrude along an axial direction of the motor shaft from an outer circumferential part of the disk part toward the motor substrate and that are arranged at predetermined intervals along a circumferential direction of the disk part; and the rotation detector is a photointerrupter that includes a light-emitting element and a light-receiving element arranged to sequentially sandwich each of the teeth of the code wheel rotating therebetween.

20. A paper sheet handling device comprising the paper sheet transport device according to claim 19.

21. A paper sheet handling device comprising the paper sheet transport device according to claim 14.

22. The paper sheet transport device according to claim 13, wherein the motor includes a housing that houses a rotor, and a motor shaft that rotates integrally with the rotor and that has both end parts in an axial direction protruding from end faces of the housing in an axial direction;

a resin pinion gear that transmits drive force to the transport unit is fixed to one end part of the motor shaft in an axial direction;

the second threshold temperature is set to prevent the pinion gear from having a temperature above a normal heatproof temperature;

the fourth threshold temperature is set to prevent the pinion gear from having a temperature above a maximum operating temperature;

the sixth threshold temperature is set to prevent the pinion gear from having a temperature above a softening temperature; and the second reading-side threshold temperature is set to prevent the reading unit from having a temperature above an upper limit of an allowable operating temperature.

23. A paper sheet handling device comprising the paper sheet transport device according to claim 13.

24. A method of preventing overheating of a motor-driven paper sheet transport device comprising:

utilizing a motor-side temperature sensor to measure a temperature of the motor;

positioning a thermally conductive member between the motor-side temperature sensor and the motor;

utilizing a reading unit including a reading-side temperature sensor to measure a temperature at the reading unit; and configuring a controller for:

responsive to the motor-side temperature sensor detecting a second threshold temperature or a higher temperature, alternatively repeating control to stop the motor for a first pre-established number of seconds and driving the motor to transport a first pre-established number of the paper sheets until the motor-side temperature sensor detects a first threshold temperature or a lower temperature, responsive to the motor-side temperature sensor detecting a fourth threshold or a higher temperature, alternatively repeating control to stop the motor for a second pre-established number of seconds and driving the motor to transport a second pre-established number of the paper sheets until the motor-side temperature sensor detects a third threshold temperature or a lower temperature, responsive to the motor-side temperature sensor detecting a sixth threshold temperature or a higher temperature, executing control to stop the motor until the motor-side temperature sensor detects the fourth threshold temperature or a lower temperature, and responsive to a reading-side temperature sensor detecting a second reading-side threshold temperature or higher temperature, executing control to stop the motor until the reading-side temperature sensor detects a first reading-side threshold temperature or a lower temperature; and wherein the temperatures hold a relationship whereby the first reading-side threshold temperature is less than the second reading-side threshold temperature is less than the first threshold temperature is less than the second threshold temperature is less than the third threshold temperature is less than the fourth threshold temperature is less than the sixth threshold temperature and the times hold a relationship whereby the first pre-established number of seconds is less than the second pre-established number of seconds.

* * * * *